Figure 5:
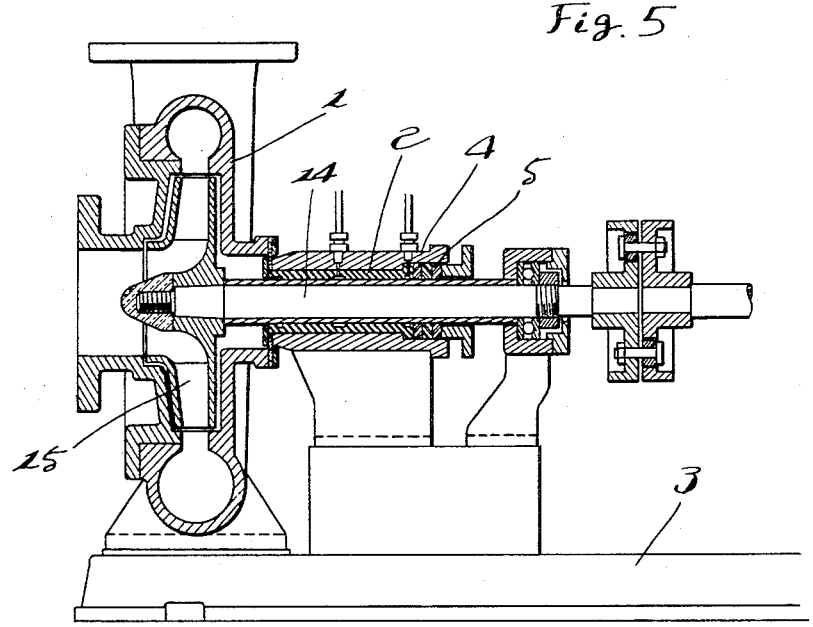

Nov. 14, 1967  YUICHIRO FURUKAWA  3,352,610
BEARING FOR IMPELLER SHAFT
Filed Feb. 4, 1965  2 Sheets-Sheet 1
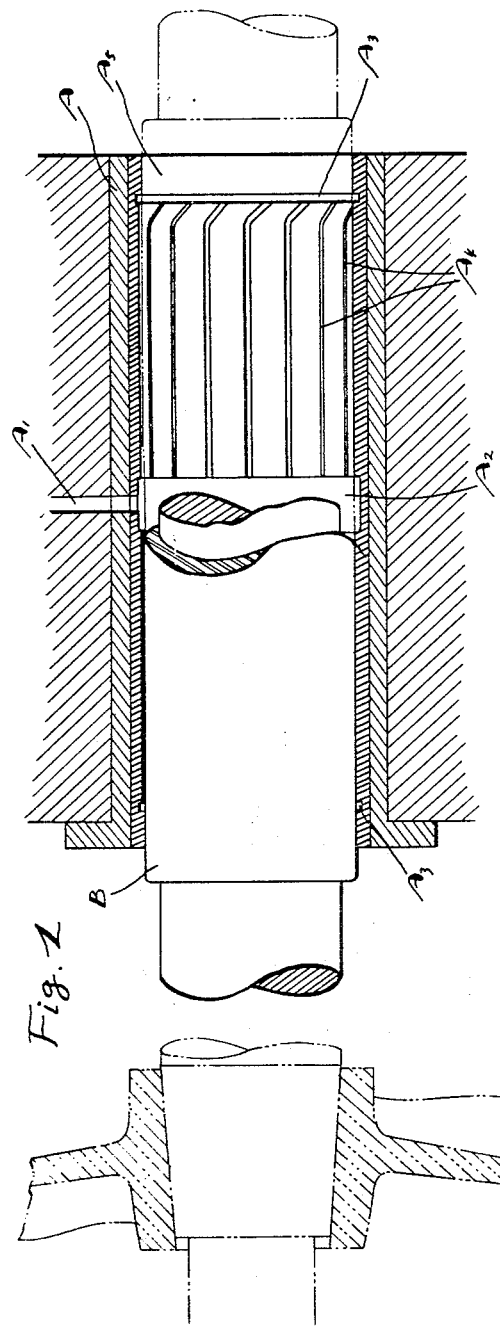
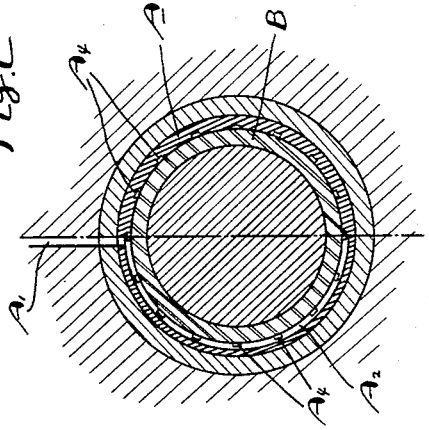
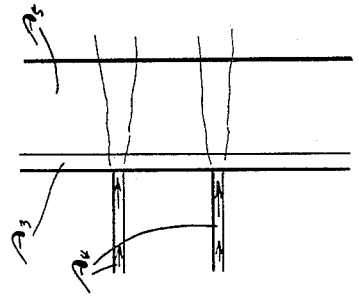
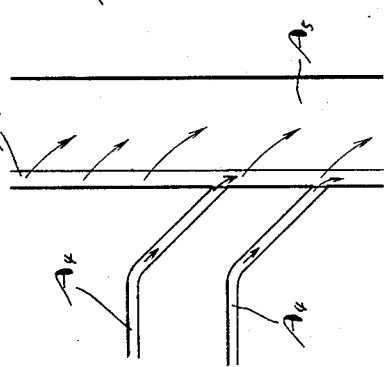
YUICHIRO FURUKAWA
INVENTOR
BY *Mousay Kojima*
ATTORNEY

United States Patent Office 3,352,610
Patented Nov. 14, 1967

3,352,610
BEARING FOR IMPELLER SHAFT
Yuichiro Furukawa, 151 Higashi-ichibacho, Ikeda, Japan
Filed Feb. 4, 1965, Ser. No. 430,342
1 Claim. (Cl. 308—122)

The present invention relates to a bearing for impeller shafts of pumps as well as for suction head cutter shafts of dredgers and propeller shafts of general vessels.

In the conventional types of bearings for the above-mentioned shafts, the bearing is provided with a bush made of lignum vitae or cast iron and the shaft is provided with a sleeve made of cast steel, and the latter is supported in the former by the intermediary of a fluid film formed between the bush and the sleeve with water or other system-liquids fed in with or without high pressure. However the conventional bearings have a great disadvantage that they are worn down very rapidly, say, they will require to be renewed every 6 months in a costly and troublesome manner.

A major object of the invention is to obtain a bearing for impeller shafts of pumps as well as for suction head cutter shafts of dredgers and propeller shafts of general vessels which is free from the above-described disadvantage of conventional bearings.

Initially, I the inventor made an analytical study on why the conventional bearing bushes for impeller shafts are worn down in such a rapid way. And I found in conclusion that a "true fluid film" might not be formed between the bearing bush and the shaft sleeve in each of the conventional types of bearings; if a "true fluid film" should be formed between them, the bearing bush could not be worn down so rapidly.

And then, the inventor tried to obtain a bearing which would form a "true fluid film" between the bush and the shaft sleeve; and the "true fluid film" must be so strong that it will not be broken even when the shaft bears a sufficiently large load.

Conventionally water or other system-liquid is fed into the clearance between the bearing bush and the shaft sleeve with a sufficient pressure so as to maintain a "true fluid film," but in vain as formerly described.

In addition to the pressure-feeding of water or other system-liquid between the bearing bush and the shaft sleeve, the inventor found it necessary to construct the bearing in a manner to form a continuous and uniform fluid film between the bearing bush and the shaft sleeve, and to maintain the fluid film in a possible strongest state between them.

For this effect it is necessary to maintain lubricant with sufficient pressure between the bearing bush and the shaft sleeve.

Then it must be avoided that the bearing bush is made of metallic material. A metallic bearing bush would be either of two-split type or of integral type. If the bush is of two-split type, it would not be possible to maintain lubricant with sufficient pressure between the bearing bush and the shaft sleeve as it naturally leaks through the fine split gap. If the bush is then of integral type, the inner diameter of bush would be required substantially larger than the outer diameter of shaft sleeve so as to permit the latter to be inserted into the former smoothly, but such a substantial clearance between the bush and the sleeve would naturally make it impossible to maintain lubricant with sufficient pressure there, either.

Alternatively, the inventor makes a bearing bush of integral type from swelling matter, such as synthetic resin. The bearing bush of swelling matter will not only permit the shaft sleeve to be inserted into the bush smoothly even with the clearance being substantially small between them, but also maintain lubricant with sufficient pressure between them—and actually the strength of lubricant film will be even more increased correspondingly that the clearance gets smaller as the bush wells in contact with the lubricant. But it will not always mean that lubricant thus filled between the bearing bush and the shaft sleeve is distributed with substantial uniformity and complete continuity. The desired effect will not be obtained unless the fluid film of lubricant is distributed with substantial uniformity and complete continousness all over in addition that it is maintained with sufficient pressure there.

To form a continuous and uniform fluid film between the bearing bush and the shaft sleeve, the inventor provided three annular grooves in the inner wall of bearing bush; one in the central portion of bearing bush to guide the system-liquid into the clearance between the bearing bush and the shaft sleeve, and the other two respectively in the both cuff portions of bearing bush to guide the system-liquid out of the clearance, while the three annular grooves are interconnected with a plurality of shallow axial grooves also provided in the inner wall of bearing bush. In this construction, the inventor expected that the system-liquid fed in with a sufficient pressure through the central annular groove would be flowed to the both cuff annular grooves without interruption, and therefore that a continuous and uniform fluid film would be formed between the bearing bush and the shaft sleeve with the system-liquid flooding out of the shallow axial grooves.

To maintain the fluid film in a possible strongest state between the bearing bush and the shaft sleeve, the inventor made the surface of shaft sleeve possible smoothest and minimized the clearance between the bearing bush and the shaft sleeve.

In this construction, the inventor expected that the system-liquid would be flowed between the bearing bush and the shaft sleeve continuously without yielding easily to breakage of liquid film formed by itself. Practically, the inventor honed and chrome-plated the surface of stainless steel shaft sleeve, while I provide a bearing bush of synthetic resin which had such a small clearance between itself and the shaft sleeve as would be just enough to make strong liquid film in the clearance on account of the swelling tendency of the synthetic resin bush.

Thus the inventor initially obtained a bearing for impeller shaft which was constructed generally as shown in FIG. 1, with the both cuff portions constructed as shown in FIG. 3. I applied this construction of bearing for impeller shaft of dredger. The result was all what I had expected, except in the cuff portions.

Then the inventor made an improvement of cuff portions as shown in FIG. 4. The final result was all just what I had expected. In other words, I obtained a bearing for impeller shafts free from such a rapid wear-down as the conventional bearings.

Figure 6:
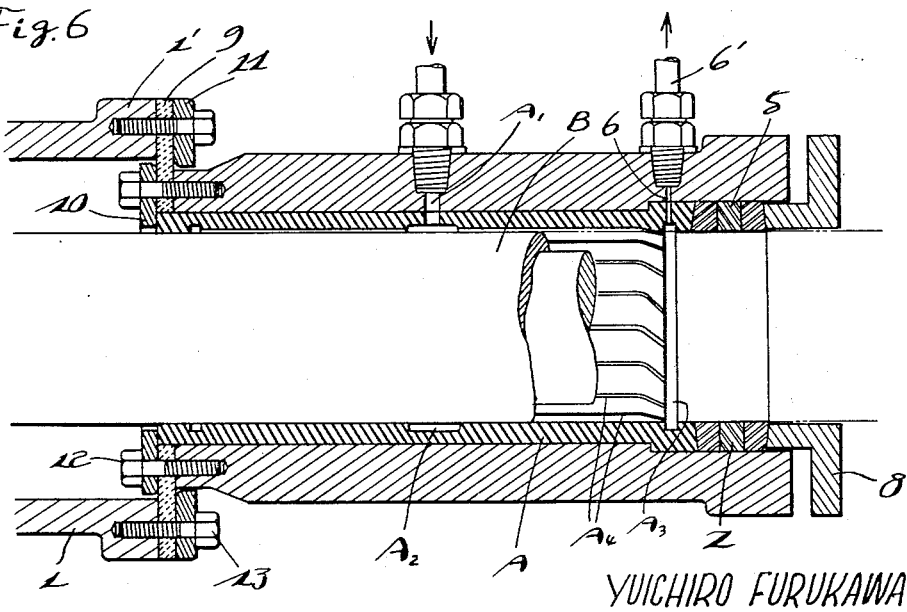

For the drawings; FIG. 1 is a vertical section of the bearing in accordance with the present invention; FIG. 2 is a cross section of FIG. 1; FIG. 3 illustrates the cuff portion of a bearing bush before it is improved to the present invention; FIG. 4 illustrates the cuff portion of the bearing bush in accordance with the invention; FIG. 5 is a vertical section of pump which is provided with the bearing in accordance with the invention; and FIG. 6 is an enlarged view of the principal part in FIG. 5.

Initially as described above, the inventor had a sleeve B of stainless steel shrink-fitted on the impeller shaft for disposal of muddy water as shown in FIG. 1. The shaft sleeve was then honed and chrome-plated. In the meantime, the bearing bush A was made of phenol resin in such a manner that an annular groove $A_2$ and a pair of annular grooves $A_3$, $A_3$ were provided at the central portion and at the both cuff portions, respectively, in the inner wall of bearing bush, while a plurality of shallow axial grooves $A_4$ were also provided in the inner wall of bearing bush to interconnect the three annular grooves $A_2$, $A_3$, $A_3$ as shown in FIG. 3. The central annular groove $A_2$ was provided with an inlet $A_1$ through which water of sufficient pressure was fed from a water source outside.

The inventor actually applied a bearing of the above-described construction to the suction head cutter shaft of dredger. The result was that the bearing performed its full duty for an effective test period of over three years without any renewal or repairment. This is a remarkable result in comparison with the well-known fact that the conventional type of cutter shaft bearing which has a cast iron bearing bush in combination with cast steel sleeve shrink-fitted on the shaft is worn down only in several months of duty, and that the conventional type of cutless bearing made of special rubber is worn down only in a year of duty or so.

In an overhauling inspection after an effective one year's duty, the inventor found that his bearing bush A was not worn at all around the central portion of inner wall where the shallow axial grooves $A_4$ were provided, but that it was worn considerably around the both cuff portions $A_5$ where the shallow axial grooves $A_4$ were not provided with an object to maintain a fluid film of sufficient pressure.

The inventor investigated the wearing around the cuff portions $A_5$ on five units of models designed for this purpose. Water of sufficient pressure was fed into the five models in atmosphere, and it was observed how the water was released out through the clearance between the cuff portions $A_5$ of bearing bush A and the shaft sleeve B while the latter was rotated. Then it was found that only one out of the five models released water in an annular film form while all the others released water in bundles which corresponded to the positions of adjacent shallow axial grooves $A_4$ as shown in FIG. 3 in spite of the fact that shallow axial grooves $A_4$ were not provided on the cuff portions $A_5$. The model investigation tells that the cuff portions $A_5$ will require to be finished on the surface in a superbly high precision to form a "true fluid film" over them, and that they will inevitably yield to some wearing unless a "true fluid film" is formed over them.

In the above-described overhauling inspection the bearing bush A was not worn at all around the central portion of the inner wall where the shallow axial grooves $A_4$ were provided. This means that a "true fluid film" was formed between the bush A and the sleeve B in the central portion though it was not finished on the surface in such a superbly high precision. Taking account of this fact, the inventor improved the cuff portion $A_5$ so as to form a "true fluid film" over the surface even though not finished in a superbly high precision. More particularly, the inventor gave the shallow axial grooves $A_4$ a bend of given angle just before they joined into the annular grooves $A_3$, $A_3$ as shown in FIG. 4. In this improvement the inventor expected that the liquid flowing into the annular groove $A_3$ would flood out with the above-described given angle, during its circulation along the annular groove $A_3$, to form a "true fluid film" over the cuff portion $A_5$ where shallow axial grooves $A_4$ were not provided, while the liquid was flooding out of the shallow axial grooves $A_4$ to form a "true fluid film" over the central portion of bush.

The inventor assured on five units of models designed as shown in FIG. 4 in the cuff portions that a "true fluid film" was released out of each cuff portion at all times.

The improved bearing was then applied to the suction head cutter shaft of dredger and also to the impeller shaft of sand pump. The inventor sometime made overhauling inspections on them; they have not been worn at all over their continuous duties these three years of effective test time. This fact tells that in accordance with the invention a "true fluid film" is always maintained between the bearing bush and the shaft sleeve; in other words, the bearing bush and the shaft sleeve will never come into a direct contact with each other. And the "true fluid film" is always maintained between the bearing bush and the shaft sleeve as the combination result of two effects; one is that the "true fluid film" is formed between the bearing bush A and the shaft sleeve B with the liquid of sufficient pressure flooding out of the narrow axial grooves $A_4$ around the central portion of bearing bush inner wall and also out of the annular grooves $A_3$ in the both cuff portions $A_5$ while the liquid is circulating along the annular grooves $A_3$; the other is that the "true fluid film" is flowing over a sufficiently smooth surface of shaft sleeve B while the clearance is minimized between the bearing bush A and the shaft sleeve B because the former is made of swelling matter such as fiber-containing phenol resin which, even in the case of direct contact with the latter, will keep itself in such a sliding relation with the latter as to permit the liquid to go between them for continuous maintenance of the "true fluid film."

In an embodiment of the present invention as shown in FIGS. 5 and 6, a pump casing 1 is provided with a bearing 2 constructed as above-described. Both the pump casing 1 and the bearing 2 are supported on a common bed 3. The housing 4 of bearing 2 is provided with a stuffing box 5 at the rear end. The stuffing box 5 is made water-tight with a gland packing 7 and a gland 8. The annular groove $A_3$ in the rear cuff portion of bearing bush A is provided with a pressure-liquid outlet 6, directly or by way of a tank if such is provided, and the outlet 6 is connected with an exhaust pipe 6'. The housing 4 of bearing 2 is provided with an annular shock-absorber 9 at the front end. The shock-absorber 9 is made of an elastic matter such as rubber. Its central portion is tightened to the casing 4 of bearing 2 with a bolt 12 by the intermediary of an annular washer 10, while its peripheral portion is tightened directly to the flange 1' of pump casing 1 with a bolt 13 by the intermediary of another annular washer 11.

In the conventional pumps of single-suction type, a water-sealing member is provided between the pump casing 1 and the impeller shaft 14, resulting that there is a considerable distance between the impeller 15 and the shaft bearing 2. This construction will inevitably permit the impeller shaft 14 to run out of its true course, thus causing some leakage in the gland packing. And then the gland packing will require to be tightened firmer, but the firmer tightening will damage the shaft or cause the cavitation phenomenon which is undesirable for the efficiency of the pump. Such a fault of conventional pumps of single-suction type is overcome with the bearing of the present invention because the impeller shaft 14 is connected to the impeller 15 directly without the intermediary of a water-sealing member between them. In addition, in accordance with the present invention, the impeller shaft runs with all the less friction because the system-liquid is lubricated between the shaft and the bearing. Thus the pump will be able to carry out a very reliable running with sufficiently high efficiency without any leakage; the feature of no leakage is especially appreciated in treating chemical liquids. And the bearing in accordance with the invention is applicable to the pumps of double-suction type as well.

It will therefore be said that the bearing in accordance with the present invention is of good industrial use as it gives such a remarkable effect as described above in its wide application for impeller shafts ranging from small portable pumps to large stern tubes of vessel propellers, irrespective of the nature of liquid; water, sea water, muddy water, chemical liquids or others.

What I claim is:

A bearing arrangement comprising
    a cylindrical bushing having defined therein a center annular groove and a pair of end annular grooves and a plurality of parallel grooves interconnecting said center and pair of end grooves,
    said parallel grooves having sections extending axially from said center groove, and sections extending at predetermined angles to the axis of said cylindrical bushing in the vicinity of said pair of end grooves, means for applying lubricating fluid to said center groove whereby said axially extending sections carries said fluid to said sections extending at predetermined angle for substantially even distribution to said end grooves, means for removing said fluid from at least one of said end grooves, a substantially smooth and hard shaft insertable in said bushing, said bushing being of synthetic resin expandable by said fluid whereby said fluid is held under pressure and evenly distributed between said shaft and said bushing, a hollow housing means for holding said bushing and said shaft, and means for sealing said bushing and said shaft within said housing.

References Cited

UNITED STATES PATENTS

| | | |
|---|---|---|
| 1,980,081 | 11/1934 | Ovington. |
| 2,165,916 | 7/1939 | Bissell. |
| 2,179,824 | 11/1939 | Kip. |
| 2,249,843 | 7/1941 | Marsland _____ 308—122 |
| 2,282,345 | 5/1942 | Ruths _____ 308—238 |

FOREIGN PATENTS 274,953  4/1951  Switzerland.

MARTIN P. SCHWADRON, *Primary Examiner.*

FRANK SUSKO, *Examiner.*